(12) United States Patent
Wright et al.

(10) Patent No.: US 11,803,563 B2
(45) Date of Patent: Oct. 31, 2023

(54) METHODS AND SYSTEMS FOR PROCESSING AND STORING STREAMED EVENT DATA

(71) Applicant: Shopify Inc., Ottawa (CA)

(72) Inventors: Erik Wright, Ottawa (CA); Michael Highstead, Ottawa (CA); David Muto, Ottawa (CA); David Sugden, Gatineau (CA); James Hall, Ottawa (CA)

(73) Assignee: Shopify Inc., Ottawa (CA)

( * ) Notice: Subject to any disclaimer, the term of this patent is extended or adjusted under 35 U.S.C. 154(b) by 50 days.

(21) Appl. No.: 17/004,126

(22) Filed: Aug. 27, 2020

(65) Prior Publication Data

US 2022/0067041 A1 Mar. 3, 2022

(51) Int. Cl.
*G06F 16/21* (2019.01)
*G06F 16/11* (2019.01)
*G06F 16/2458* (2019.01)
*G06F 16/248* (2019.01)
*G06F 16/2455* (2019.01)

(52) U.S. Cl.
CPC ........ *G06F 16/2477* (2019.01); *G06F 16/128* (2019.01); *G06F 16/219* (2019.01); *G06F 16/248* (2019.01); *G06F 16/24556* (2019.01); *G06F 16/24568* (2019.01); *G06F 16/11* (2019.01); *G06F 16/21* (2019.01)

(58) Field of Classification Search
None
See application file for complete search history.

(56) References Cited

U.S. PATENT DOCUMENTS

| | | | | |
|---|---|---|---|---|
| 9,547,659 | B1 * | 1/2017 | Barber | G06F 16/215 |
| 10,581,664 | B1 * | 3/2020 | Peng | H04L 41/147 |
| 2008/0244429 | A1 * | 10/2008 | Stading | G06F 16/248 |
| | | | | 707/E17.093 |
| 2012/0131049 | A1 * | 5/2012 | Ogilvie | G06F 16/951 |
| | | | | 707/769 |
| 2014/0344539 | A1 * | 11/2014 | Gordon | G06F 16/128 |
| | | | | 711/162 |
| 2015/0088811 | A1 * | 3/2015 | Hase | G06F 16/1805 |
| | | | | 707/607 |
| 2016/0055197 | A1 * | 2/2016 | Caro | G06F 16/2365 |
| | | | | 707/695 |
| 2017/0039227 | A1 * | 2/2017 | Herbst | G06F 16/219 |
| 2019/0102436 | A1 * | 4/2019 | Bishnoi | G06F 16/244 |

* cited by examiner

*Primary Examiner* — Yu Zhao
(74) *Attorney, Agent, or Firm* — Rowand LLP

(57) ABSTRACT

Methods and systems for processing real-time event data by aggregating event data over various time windows and storing aggregate event data records containing the aggregated data. The method may include receiving event data at a current time, determining that the event data relates to a time prior to the beginning of a current time window, and identifying, based on the time, one or more stored aggregate event records each associated with a respective previous time window. The method may include creating, for each of the identified one or more stored aggregate event records, a new aggregate event record containing updated aggregate event data adjusted by the event data, and storing each new aggregate event record in association with its respective previous time window and a creation timestamp reflecting the current time.

19 Claims, 7 Drawing Sheets

FIG. 2

METHODS AND SYSTEMS FOR PROCESSING AND STORING STREAMED EVENT DATA

FIELD

The present disclosure relates to computer-implemented methods and systems for storing and retrieving streamed event data and, in particular, to methods and systems for storing and retrieving aggregate event data relating to a time window.

BACKGROUND

In many contexts, such as in the case of large networked systems with many end points, a large quantity of event-related data is produced. The event data may be available to a computing device as a datastream in some cases. An example of such a system is an online e-commerce platform. In one example, the platform may include a multi-tenant platform hosting a large number of merchants.

In large systems with a vast quantity of event data, storage of the event data can result in billions or trillions of event data entries, which can be prohibitively large for searching and extracting entries in order to reply to a query in a reasonable time frame.

BRIEF DESCRIPTION OF THE DRAWINGS

Embodiments will be described, by way of example only, with reference to the accompanying figures wherein:

FIG. 2 is an example of a home page of an administrator, according to one embodiment;

DETAILED DESCRIPTION

Figure 1:
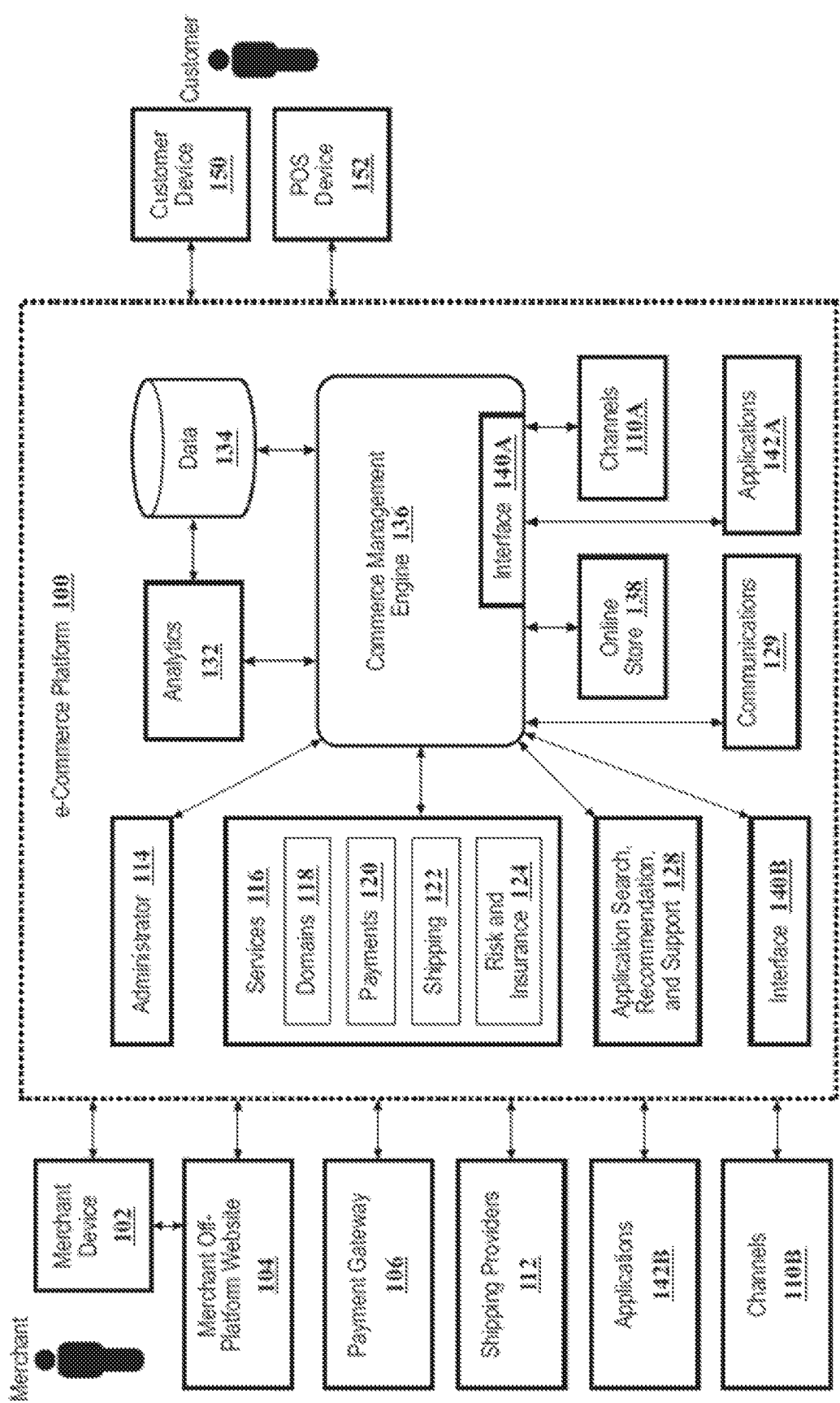
FIG. 1 is a block diagram of an e-commerce platform, according to one embodiment.

In one aspect, the present application describes a computer-implemented method for processing streamed event data. The method may include receiving event data at a current time; determining that the event data relates to a time prior to the beginning of a current time window; identifying, based on the time, one or more stored aggregate event records each associated with a respective previous time window; creating, for each of the identified one or more stored aggregate event records, a new aggregate event record containing updated aggregate event data adjusted by the event data; and storing each new aggregate event record in association with its respective previous time window and a creation timestamp reflecting the current time.

In some implementations, identifying may include determining that the time prior to the beginning of the current time window falls with the respective previous time window.

In some cases, identifying may further include identifying two or more stored aggregate event records associated with a same previous time window and selecting one of the two or more stored aggregate event records based on it having a most recent creation timestamp. In some cases, creating may include, for each of the identified one or more stored aggregate event records, generating a copy of that stored aggregate event record, adjusting aggregate event data within the copy based on the received event data, and storing the copy containing adjusted aggregate event data as the new aggregate event record.

In some implementations, the method may further include receiving additional event data relating to the current time window; adjusting a current aggregate event parameter based on the additional event data; determining that the current time matches an end of the current time window; and responsive to determining that the current time matches an end of the current time window, storing the current aggregate event parameter in a current aggregate event record.

In some implementations, wherein each stored aggregate event record may include metadata, and the metadata associated with a given stored aggregate record includes an associated previous time window for the given record and a creation timestamp for the given record. In some cases, the metadata may further include at least one of a merchant identifier, a store identifier, or a product identifier. In some cases, the metadata may further include a window start time and a window end time for the associated previous time window.

In some implementations, the event data may relate to a sales metric and each stored aggregate event record may include a respective aggregated total sales metric associated with the previous time window.

In another aspect, the present application describes a computer-implemented method of providing a client device with aggregated event data. The method may include receiving, from the client device, a query associated with a start time, an end time, and a snapshot time; identifying a plurality of stored aggregate event records, each having an associated time window, wherein the associated time windows of the plurality of stored aggregate event records are non-overlapping and span a window from the start time to the end time; for each identified stored aggregate event record for which there are multiple versions present, selecting a version of that stored aggregate event record having an associated creation timestamp not exceeding the snapshot time; and providing, to the client device, aggregated data from the identified and selected aggregate event records.

In some implementations, selecting may include selecting the version of that stored aggregate event record based on its creation timestamp being closest to, and not exceeding, the snapshot time.

In some implementations, the start time may include a start date and time, the end time may include an end date and time, and the snapshot time may include a snapshot date and time.

In some implementations, identifying may include selecting a minimum number of stored aggregate event records to span the window from the start time to the end time. In some cases, selecting the minimum number may include selecting, from amongst possible stored aggregate event records, at least one stored aggregate event records having the longest associated time window that fits within the window from the start time to the end time.

In some implementations, the request may further include a specified window length, and identifying the plurality of stored aggregate event records may include selecting stored aggregate event records on the basis that their associated time window has the specified window length. In some cases, providing, to the client device, aggregated data from the identified and selected aggregate event records may include extracting aggregate data from the identified and selected stored aggregate event records and providing the client device with the extracted aggregate data.

In some implementations, providing, to the client device, aggregated data from the identified and selected aggregate event records may include extracting aggregate data from each of the identified stored aggregate event records; aggregating the extracted aggregate data to produce an aggregated total; and providing the client device with the aggregated total.

In some implementations, providing, to the client device, aggregated data from the identified and selected aggregate event records may further include providing the client device with real-time event data.

In another aspect, the present application describes a system that includes at least a processor and memory storing processor-executable instructions that, when executed by the processor, cause the processor to carry out the operations of at least one of the methods described herein.

In yet a further aspect, the present application describes a non-transitory computer-readable medium storing processor-executable instructions that, when executed by one or more processors, are to cause the one or more processors to carry out the operations of one or more of the methods described herein.

For illustrative purposes, specific example embodiments will now be explained in greater detail below in conjunction with the figures.

Streamed Event Data

In many contexts, such as in the case of large networked systems with many end points, a large quantity of event-related data is produced. The event data may be available to a computing device as a datastream in some cases. In some examples, the computing device may be a server or multiple servers.

The computing device may store the event-related data in a large database or other data structure. In large systems with a vast quantity of data, this can result in billions or trillions of event data entries, which can be prohibitively large for searching and extracting entries in order to reply to a query in a reasonable time frame. In many cases, the query may be a request for aggregated data, i.e. an aggregate of specific events over a query time period.

Accordingly, to speed query responses the computing device may create and store aggregated event records in advance from the streamed event data. One of the challenges of creating and storing aggregated event records is that some events may have an impact on aggregated data that was created and stored in a previously-created aggregate event record. If that previously-created aggregated event record is simply updated based on the new event some historical context and data may be lost in the aggregation. Accordingly, the present application provides methods, systems, and data structures for processing streamed event data and for providing a response to a query from a client device. The methods and systems may handle updates to previously-created aggregate event records in response to a new event that preserves the historical record of aggregated data for the purpose of certain queries, and yet updates that historical record for the purpose of other queries.

The computing device may have one or more processors (sometimes termed herein "event aggregators" or "job processors") configured to read event data and aggregate the event data to produce an aggregate event record containing the aggregated data. Each event aggregator may be assigned to aggregate data over a defined window of time and to produce its aggregate event record at the end of the window of time. Each event aggregator may further be assigned to aggregate one or more specific categories or types of events.

One context in which this issue may arise is in connection with electronic or on-line commerce events. For example, an online store or e-commerce platform may have a large number of time-associated events that occur, such as sales events, payment events, inventory events, return events, credit events, refund events, and the like. In some cases, an event may have an associated time-of-occurrence but the event may be present in the data stream and/or read by the computing device at a later time.

As an example, a payment event may relate to a payment that was processed by a payment processor and may have an associated timestamp for the time at which the payment was processed. However, the payment event may be present in the data stream and may be read by the computing device at a later time. If the time is sufficiently later, then the event may be read by an event aggregator that is aggregating event data over a defined time window with a start time after the time-of-occurrence of the payment event. In other words, the payment event may relate to a time window associated with a previously-created and stored aggregate event record. In order to process the payment event, the event aggregator may modify the previously-created and stored aggregate event record to adjust the aggregate total reflected in that record. In accordance with one aspect of the present application, the mechanism and data structure for making that adjustment preserves the original aggregate event record information as it was originally saved and provides for a new version of that information in an updated aggregate event record relating to that previous time window.

As another example, some events may inherently relate to (or impact) past events. For instance, a refund or return, depending on the manner of accounting, may "undo" or offset a previous sale event. If the refund or return event occurs in a subsequent time window, then the event aggregator may want to modify the previously-created event record relating to the time at which the sale event was included in aggregated data in order to modify that aggregated data due to the return or refund.

Other example systems involving streamed event data may include supply chain management or inventory systems, distributed media impression tracking systems, or any system in which event data may be aggregated over time windows and at least one type of event may be received or read in a time window that has an impact on the aggregation determined for a previous time window. The present application is not necessarily limited to e-commerce platforms or to multi-tenant e-commerce platforms, although they provide possible illustrative implementation examples in the present description. Accordingly, example operation and implementation of an e-commerce platform will be described below.

Example E-Commerce Platform

In some embodiments, the methods disclosed herein may be performed on or in association with an e-commerce platform. Therefore, an example of an e-commerce platform will be described.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers (or "purchasers") as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
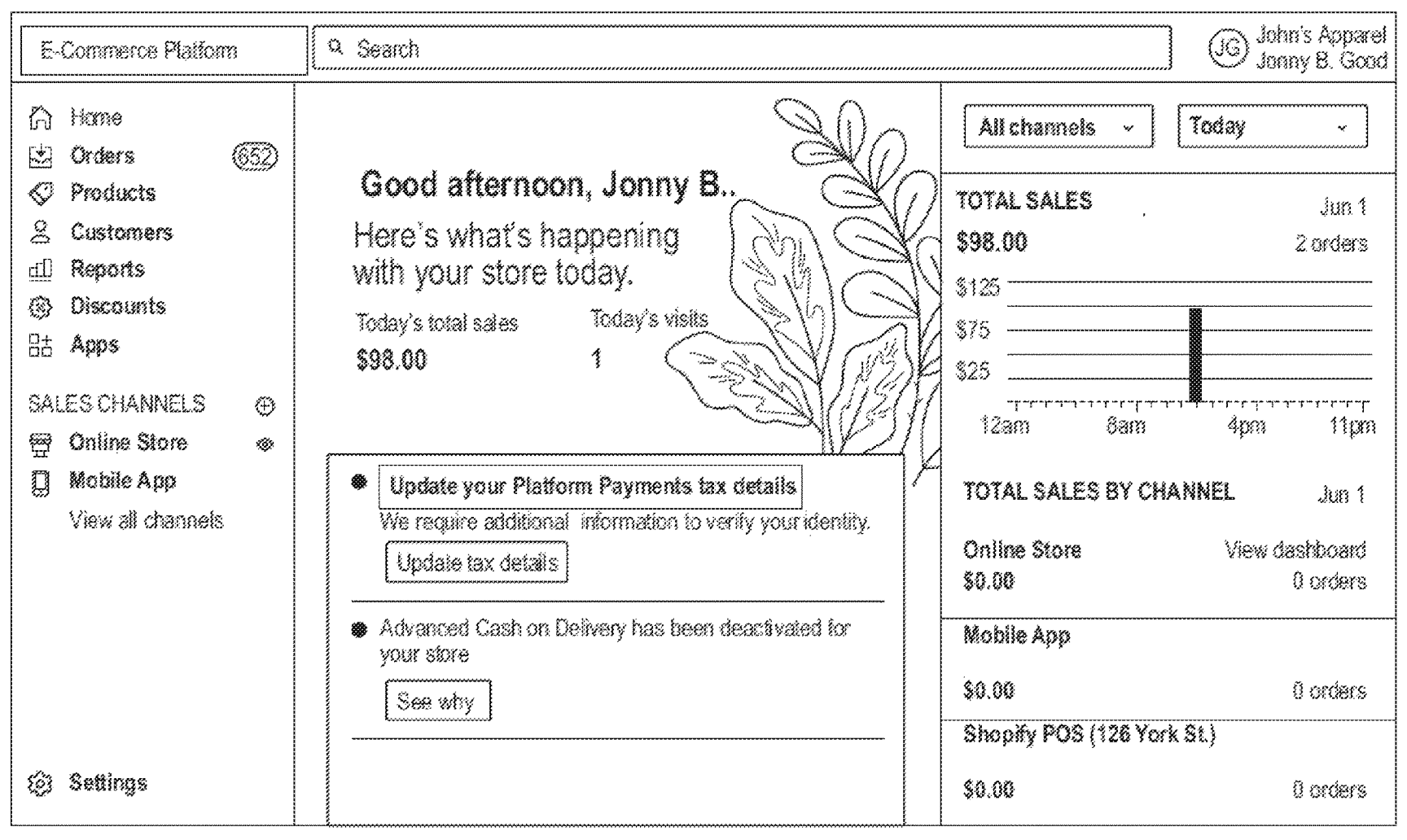

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for the communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a platform payment facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The platform payment facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharing) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for the platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through an application search, recommendations, and support platform 128 or system. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant- and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide the application search, recommendation and support platform 128. The application search, recommendation and support platform 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the lifespan of a cart may be in the order of minutes, carts may be persisted to an ephemeral data store in some cases. However, in many implementations, while the customer session may only last minutes, the merchant and/or customer may wish to have the possibility of returning to a cart built in a previous session. Accordingly, the cart, e.g. the shopping cart data structure populated with product item data and a user identifier, may be stored in persistent memory on the platform 100.

In a typical session, a customer proceeds to checkout at some point after adding one or more items to their shopping cart. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer does not complete the transaction, the e-commerce platform 100 may retain the shopping cart data structure in memory so that the customer may return to the partially-completed cart in a subsequent session (e.g., in an abandoned cart feature).

Checkouts may calculate taxes and shipping costs based on the customer's shipping address. Checkout may delegate the calculation of taxes to a tax component and the calculation of shipping costs to a delivery component. A pricing component may enable merchants to create discount codes. Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Event Data Aggregation

As noted above, systems that involve a large quantity of time-associated event data may create and store aggregated event records from streamed event data. A computing device in the system may read the stream of event data to extract relevant events for a particular aggregation and, over a time window, aggregate that event data for a certain parameter and store the aggregated total in an aggregate event record. The computing device may have one or more event aggregators configured to read event data and aggregate the event data to produce a respective aggregate event record containing the aggregated data. Each event aggregator may be assigned to aggregate data over a defined window of time and to output the resulting aggregate event record at the end of the window of time. Each event aggregator may further be assigned to aggregate one or more specific categories or types of events or parameters signaled by those events.

Figure 3:
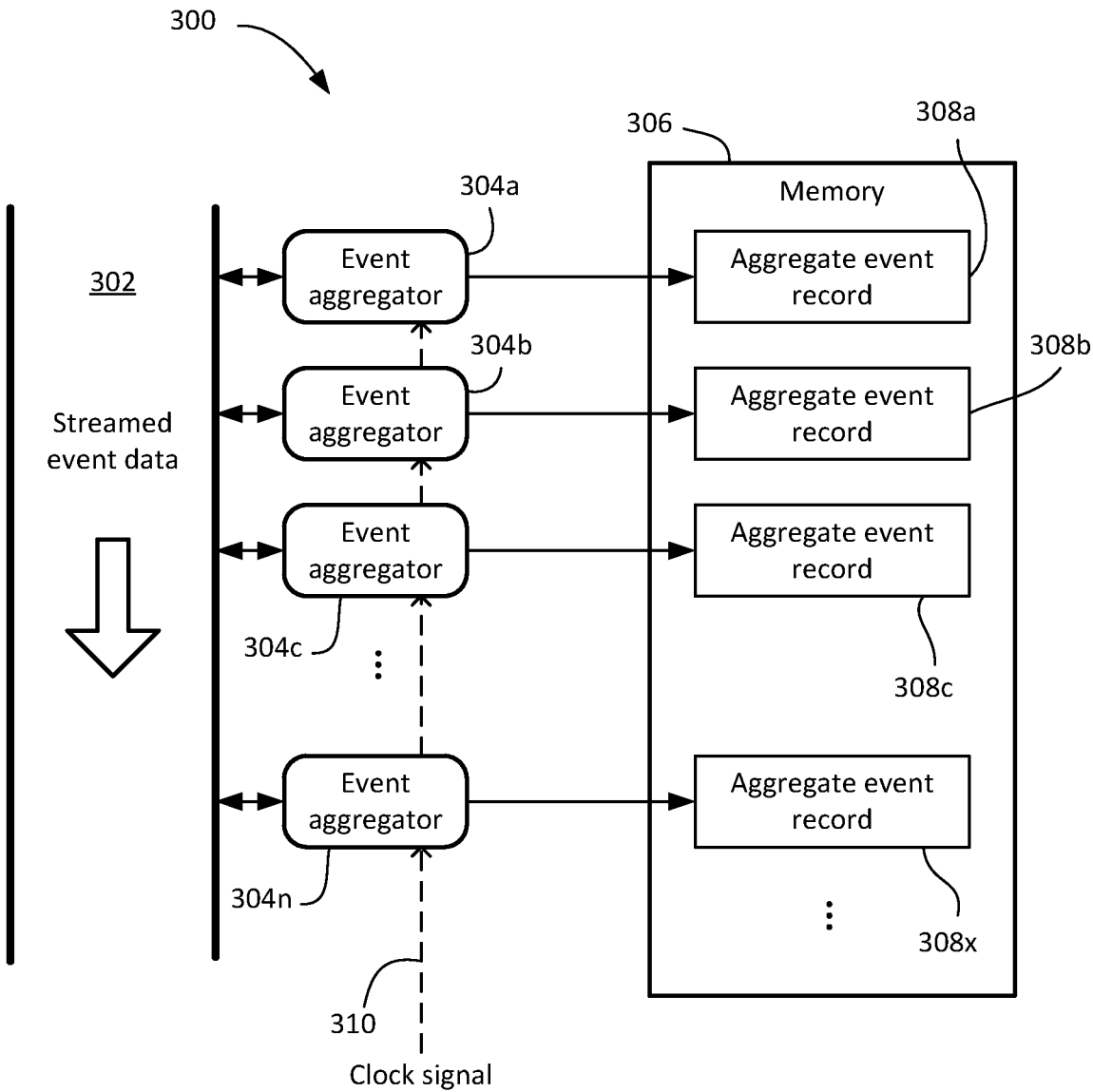
FIG. 3 diagrammatically shows one example system for aggregating event data.

Reference is now made to FIG. 3, which diagrammatically shows one example system 300 for aggregating event data. The system 300 includes streamed event data 302. The streamed event data 302 may be received from a plurality of sources.

The system 300 includes a plurality of event aggregators 304 (shown individually as 304a, 304b, 340c, . . . , 304n). Each event aggregator 304 may be configured to aggregate event data over a defined time window. In some examples, the time windows may include 15 minutes, 30 minutes, an hour, a day, a week, a month, etc. The time windows over which individual event aggregators 304 aggregate data may overlap. That is, one event aggregator 304 may be aggregating event data over a 15 minutes window and at the same time another event aggregator 304 may be aggregating the same type of event data, but over a 30 minute window. The windows may have the same start time and/or end time or may have different start and/or end times. As a time window expires, the event aggregator 304 may output the resulting aggregated data for that time window and begin another cycle of aggregation for a next successive time window of the same duration.

In one example based on a broadcast model, the streamed event data 302 may be a general broadcast stream of event data accessible to all event aggregators 304. Each event aggregator 304 applies filters to select only event data of interest to that event aggregator 304.

In another example based on a publish-subscribe model, each event aggregator 304 may register its interest in certain types or classes or sources of events with a stream controller. Each time an event is received or detected the stream controller determines which event aggregator(s) 304 have 'subscribed' to that event. The stream controller may then, in some cases, send the event to those event aggregators 304 or may send a notification to those event aggregators 304 regarding the availability of the event data.

In yet another example based on a polling model, each event aggregator 304 periodically transmits a polling request to a stream controller(s) asking for certain classes/types/sources of event data that have occurred since its last polling of the stream controller(s). The stream controller(s) then provide event data (if any) in response to the polling request.

Whether using a broadcast model, a publish-subscribe model, or a polling model, each event aggregator 304 may be considered to be monitoring the streamed event data 302 for event data relevant to its aggregation. That is, some event aggregators 304 may be configured to aggregate event data relating to, for example, sales, in total dollars, count of items, count of purchasers, etc., or based on some other parameter or metric. Other parameters or metrics may be aggregated, such as, for example, media impressions-to-sales, count of returns, etc. The events being aggregated may be restricted to events of a defined type. As an example, an event aggregator may be configured to aggregate a parameter, such as sales in dollars, associated with a particular geographical scope, purchaser type, merchant category, product category, merchant ID, store ID, or other such sub-categories.

The event aggregators 304 may be implemented within the computing device or computing devices using any suitable software implementation. In some examples, each event aggregator 304 may be and/or correspond to a sub-routine, an object, a process, a thread, etc., depending on, for example, programming paradigm and operating system environment. Each event aggregator 304 may be a separate process or job in some cases.

The system 300 may include a system clock providing a clock signal 310 to each of the event aggregators 304 and from which the event aggregators 304 determine the start and stop of their respective aggregation operations for their respective time windows. In some other implementations, each event aggregator 304 may operate its own clock and/or timer. The system clock signal 310 may be used to sync the individual clocks and/or timers of the event aggregators 304 in some cases, either initially at instantiation of the event aggregator(s) 304 and/or periodically as each time window expires and begins anew.

The event aggregators 304 each output an aggregate event record 308 (shown individually as 308a, 308b, . . . , 308x) at the end of their respective time windows. The aggregate event records 308 are stored in a memory 306. The memory 306 may be a persistent computer-readable storage medium. The memory 306 may be structured in any suitable manner for the efficient storage and retrieval of aggregate event records 308. In some examples, the memory is configured as a database file system.

Figure 4:
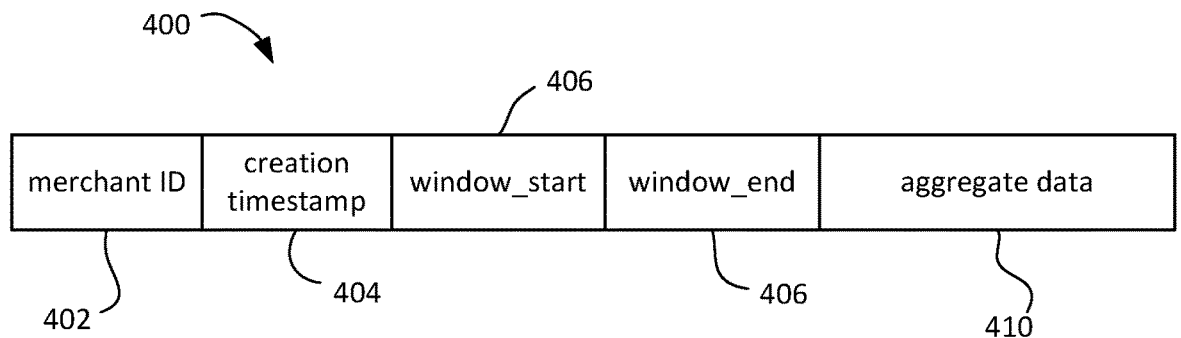
FIG. 4 illustrates an example structure of an aggregate event record according to one embodiment.

Reference is now made to FIG. 4, which illustrates an example structure of an aggregate event record 400 according to one embodiment. In this example, the aggregate event record 400 includes certain metadata fields, such as a merchant identifier 402, a creation timestamp 404, a window_start time 406 and a window_end time 408. The aggregate event record 400 may include other metadata fields (not shown), such as a checksum, hash value, or other data integrity verification field, an event type or category code, a payload length field, etc. In some cases, the metadata may include a window_length value defining the time window over which data was aggregated. In such a case, either the window_start time or the window_end time may not be included in the metadata. References herein to a time, timestamp, or the like, may be understood to include both time and date information so as to mark a specific point in time. In some cases, a timestamp or the window_start time or window_end time may be expressed in Unix time (e.g., a time since an epoch such as, for example, 1 Jan. 1970; also referred to as POSIX time, UNIX epoch time, etc.). In some cases, one or more time values may be expressed in an ISO 8601 format. In some cases, one or more time values may be expressed in terms of Unix-max-time minus current point-in-time. The metadata may be serialized and each field may have a prescribed length to enable reading of the metadata. The metadata may be stored in a data structure having prescribed fields, prefixes, or other flags to facilitate easy reading and/or searching of the stored aggregate event records 400.

The aggregate event record 400 further includes aggregate event data 410. In some cases, this may be referred to a payload or a payload field. The aggregate event data 410 includes at least one data entry specifying an aggregated value of a metric or parameter relating to the event data read and aggregated by the event aggregator 304 (FIG. 3).

Figure 5:
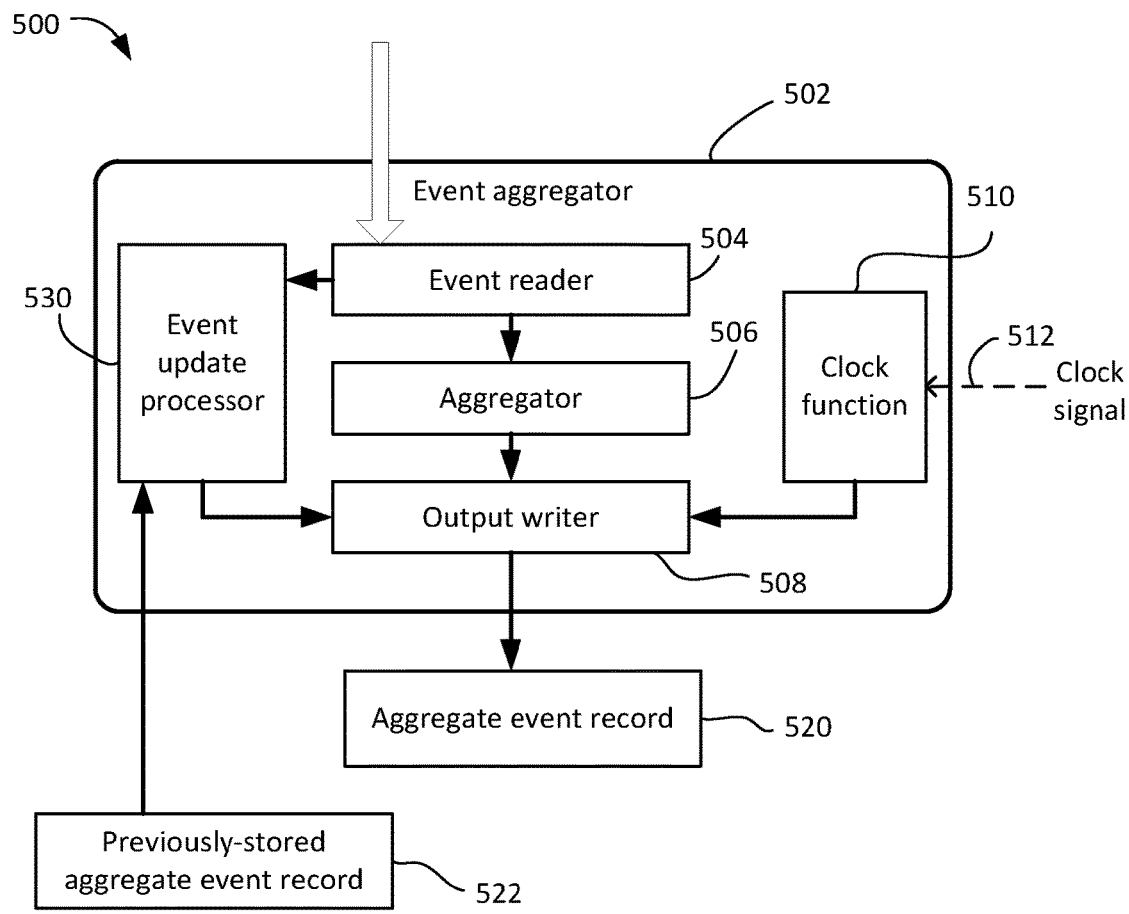
FIG. 5 shows, in block diagram form, one illustrative example of an event aggregator.

FIG. 5 shows, in block diagram form, one illustrative example of an event aggregator 500. The event aggregator 500 may be implemented by way of processor-executable instructions that, when executed by one or more processors, are to cause the one or more processors to carry out the described operations. In that respect, the sub-components or parts of the event aggregator 500 described below may be, in some cases, implemented by specific processor-executable instructions, which in some cases may be particular commands, operations, sub-routines, threads, messages, or other programming constructs. In some cases, those operations or instructions cause the processor(s) to employ one or more other hardware and/or software components to carry out the operation, such as a network port, network card, signal bus, etc.

The event aggregator 500 is configured to aggregate data for a particular type or class of event over a defined time window. In some cases, the particular type or class of event may be restricted to certain event type, e.g. sales and returns, may be restricted to certain geographic areas, e.g. sales by stores in a specific state, may be restricted to certain merchants, e.g. merchants in a specific industry, such as paint sales, and/or may be restricted to specific merchant, as examples. The event aggregator 500 may include an event reader 504 which monitors the streamed event data and reads and/or extracts event data based on it being relevant to the event type/class being aggregated by the event aggregator 500.

The event reader 504 may include any extracted relevant event data to an aggregator 506 that performs the operation of aggregating the event data. New event data is added (or subtracted, if it is of a type that reduces the aggregated total, e.g. a return may reduce an aggregation of sales data) to the aggregated total maintained by the aggregator 506. In some cases, the aggregator 506 may aggregate more than one parameter or metric in parallel.

The event aggregator 500 may further include a clock function 510 for initiating the aggregation at the start of a time window, monitoring duration of the current time window, and detecting the end of the current time window. The clock function 510 may, in some cases, receive an external clock signal 512, such as a system clock signal. In some cases, the clock function 510 may additionally or alternatively operate an internal clock and/or timer.

The event aggregator 500 may further include an output writer 508. The output writer 508 generates and outputs an aggregate event record 520 at the end of a time window. The output may be triggered by an end-of-window signal from the clock function 510 in some cases. The output writer 508 obtains the aggregate event data from the aggregator 506 for insertion in the payload field of the aggregate event record 520. The output writer 508 may insert a creation timestamp in the aggregate event data. As noted above the creation timestamp may reflect a Unix time value, a Unix-max-time-minus-current-time value, an ISO 8601 format value, or any other format for specifying a current point-in-time.

In some situations, as will be further described below, the event aggregator 500 may detect an event in the streamed event data that relates to a time window prior to the current time window. This may be due to delay in reading or receiving the event data or may be due to the event data being of a type that impacts a prior aggregation of data (e.g., in the commerce context, a return that effectively negates a previously-aggregated sale). In such a case, the system may be configured to create a new aggregated event record for the previously-aggregated time window that reflects the changed aggregated value due to the new event. In this example, the creation of the new aggregated event record may be carried out by an event update processor 530. The event update processor 530 is shown as being a part of the event aggregator 500 in this example. In some cases, the event update processor 530 may be external to the event aggregator 500.

If the event reader 504 identifies an event that is relevant to the data being aggregated by the event aggregator 500 but that relates to a time prior to the current time window over which the aggregator 506 is aggregating data, then it may pass the event data to the event update processor 530. In some cases, an event may be relevant to a current time window and relevant to a previously-aggregated time window. That is, it may be handled by both the aggregator 506 for adjusting an aggregated metric for the current time window and by the event update processor 530 for generating a new aggregate event record based on an existing and previously-stored aggregated event record 522.

The previously-stored aggregated event record 522 relates to a previous time window and the time associated with the event data falls within the previous time window. The previously-stored aggregated event record 522 may be identified by the event update processor 530 by searching a memory storing aggregated event records for a stored record having an associated time window that contains the time associated with the event. The event update processor 530 may retrieve the identified previously-stored aggregate event record. A copy of the previously-stored aggregate event record may be made and its aggregate event data may be updated by the event update processor 530 based on the event data. The event update processor 530 then updates the creation timestamp field based on the current time and stores the updated copy of the previously-stored aggregate event record as a new version of that aggregate event record without overwriting the old version of the aggregate event record. The new version will have a more recent creation timestamp, but will still relate to the previous time window, and will have updated aggregate event data.

Accordingly, the memory may contain multiple "versions" of an aggregate event record relating to a specific time window and containing the same aggregated parameter or metric(s). Each version has different aggregate event data as each successive version is based on an update to the aggregate event data, and versions may be identified by their associated creation timestamps.

In one example implementation, each update event processor 530 is implemented within a specific event aggregator, such that each update event processor 530 is associated with a specific time window duration. In such an example, the update event processor 530 may only search for and retrieve previously-stored aggregate event records on the basis that they relate to the same time window duration and that the time associated with the event falls within the specific time window, e.g. only aggregate event records relating to 15 minute duration time windows are searched for one containing the time associated with the event, and separate update event processors are relied upon for handing the update of any previously-stored aggregate event records relating to other duration time windows like 30 minute or hour long windows.

In another example implementation, the update event processor 530 is external to the event aggregator 500 and an event relating to a time period prior to a current window for that event aggregator 500 results in a notification to the external update event processor 530. In such an implementation, the external update event processor 530 may search for all previously-stored aggregate event records having associated time windows within which the time falls. This may result in the update event processor 530 managing the creation of new updated versions of more than one aggregate event record. In such cases, the update event processor 530 may receive notification regarding the same event data from more than one event aggregator 500.

Figure 6:
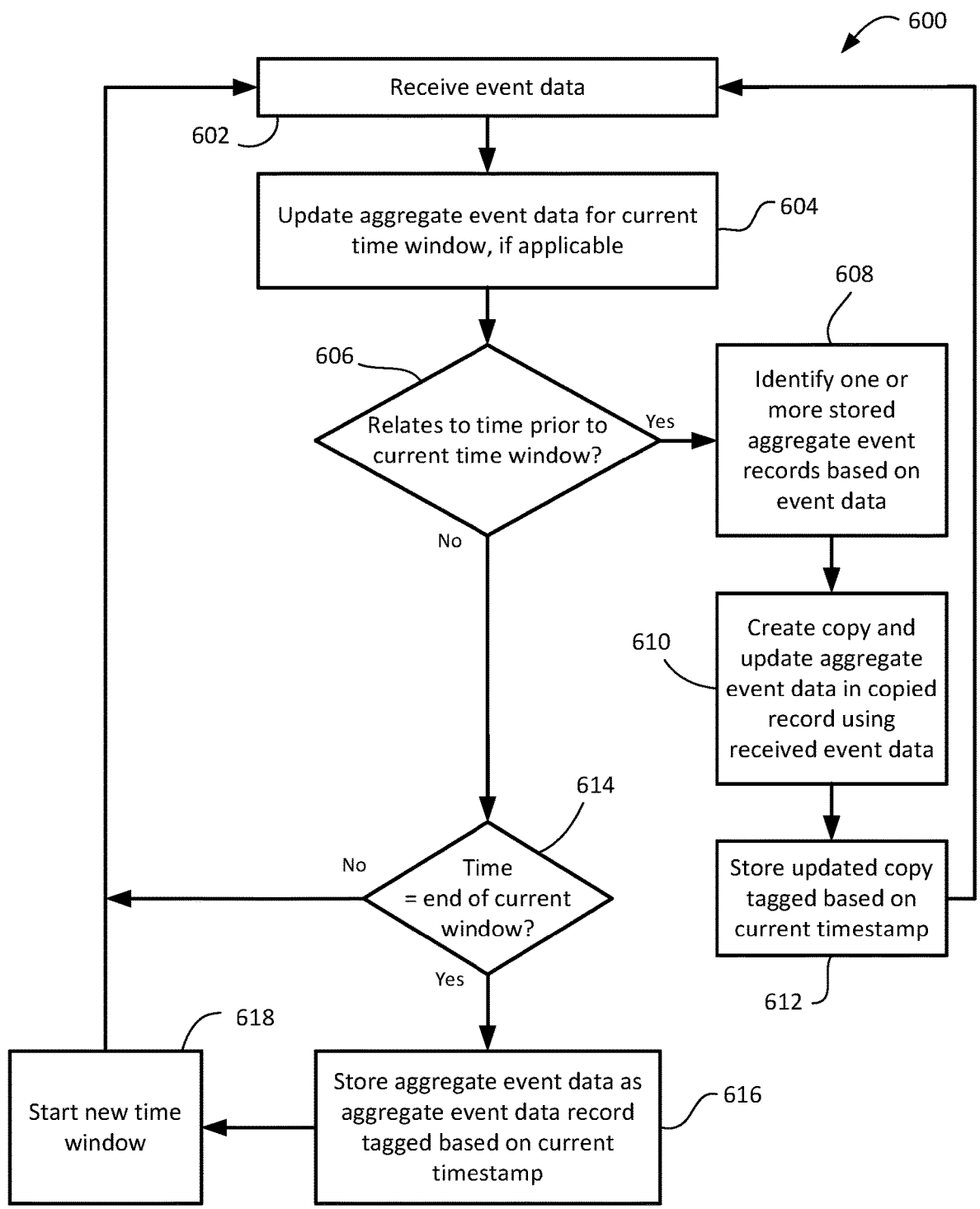
FIG. 6 shows, in flowchart form, one example method for aggregating event data.

Reference will now be made to FIG. 6, which shows, in flowchart form, one example method 600 for aggregating event data. The method 600 may be implemented by a computing device having suitable computer-executable instructions for causing the computing device to carry out the described operations. The method 600 may be implemented, in whole or in part, by an event aggregator, such as the event aggregator 500 (FIG. 5).

The method 600 includes receiving event data in operation 602. The event data may be received by reading and/or extracting the event data from a stream of event data. The event data may be read or extracted based on the event data being of a type relevant to the aggregation that the event aggregator is configured to carry out. In some cases, this may mean that the event data is associated with a particular merchant, class of merchant, geographic area, store location, product item, or other characteristic.

In operation 604, the event aggregator updates its aggregation based on the event data, to the extent that the event data relates to a time within the current time window (in some cases, the event may have occurred prior to the current time window but the event data is only seen by the event aggregator after the current time window has started).

In operation 606, the event aggregator assesses whether the event data relates to a time prior to the current time window. In some cases, the event may relate solely to a time within the current time window, solely to a time within a previous time window, or to both a first time within the current time window and a second time (or times) within one or more previous time windows. If the time associated with the event relates to a previous time window, then the method 600 moves to operation 608 to identify one or more stored aggregate event records relating to the time. As noted above, in the case of an event update processor specific to an event aggregator, this operation may be limited to aggregate event records having the same window duration. In some other implementations, operation 608 includes all stored aggregate event records having an associated previous time window of any duration that includes the time associated with the event.

If one of the aggregate event records has previously been updated by the event update processor, then there may be more than one "version" of that aggregate event record stored in memory in association with the same time window. In this case, the most recently updated version of that aggregate event record is retrieved in operation 608, as is readily identifiable by its creation timestamp.

In operation 610 a copy of each of the identified aggregate event records is made and its aggregate event data is updated based on the newly-received event data from operation 602. The updated copy of that aggregated event record is then stored in operation 612 as a new record having a current timestamp as its creation timestamp.

In operation 614, the computing device assesses whether the current time window has ended based on a clock signal or timer signal. If not, then the method returns to operation 602 to process additional event data. If the time window has ended, then in operation 616 the current state of the aggregated data is inserted in the payload field of an aggregate event record and the aggregate event record is saved with the current time as its creation timestamp. A new time window of the same duration is then started in operation 618.

As a result of the method 600, the memory stores aggregate event records for various time windows of various durations and provides aggregate event data for various parameters. This collection of aggregate event data may be particularly useful in responding to queries received by the computing device from client devices seeking aggregate data. In some examples, a query may request aggregate data for a defined time period having a start time and an end time. In some cases the end time is a current time (e.g., the current "wall clock" time). The query may further indicate a snapshot time, where a snapshot time is the state of the aggregate event data as of that time. The snapshot time may be the current time, i.e. current state of the aggregate event data, or it may be some time between the current time and the end time for the time period.

As an example, a query may specify sales for a particular merchant from Jan. 1, 2020 to Mar. 31, 2020, as of Apr. 30, 2020. In this example the time period spans the start time (Jan. 1, 2020) to the end time (Mar. 31, 2020) as of the snapshot time (Apr. 30, 2020). The sales data provided in response to this query would include the aggregate sales data for Jan. 1, 2020 through Mar. 31, 2020, including any changes made retroactively to that sales data on or prior to Apr. 30, 2020. It would not include any changes made to that sales data after Apr. 30, 2020.

As another example, a query may specify hourly sales for a merchant from 00:00 through 24:00 on Jun. 15, 2020 as of 24:00 on Jun. 15, 2020. In this example, the snapshot time is the same as the end time: 24:00 on Jun. 15, 2020. The response will include hourly aggregate sales data through the day of Jun. 15, 2020, and each hourly aggregate record returned will include any updates retroactively made to those aggregate records during Jun. 5, 2020, but will not include any changes that might have occurred after midnight on Jun. 15, 2020.

Figure 7:
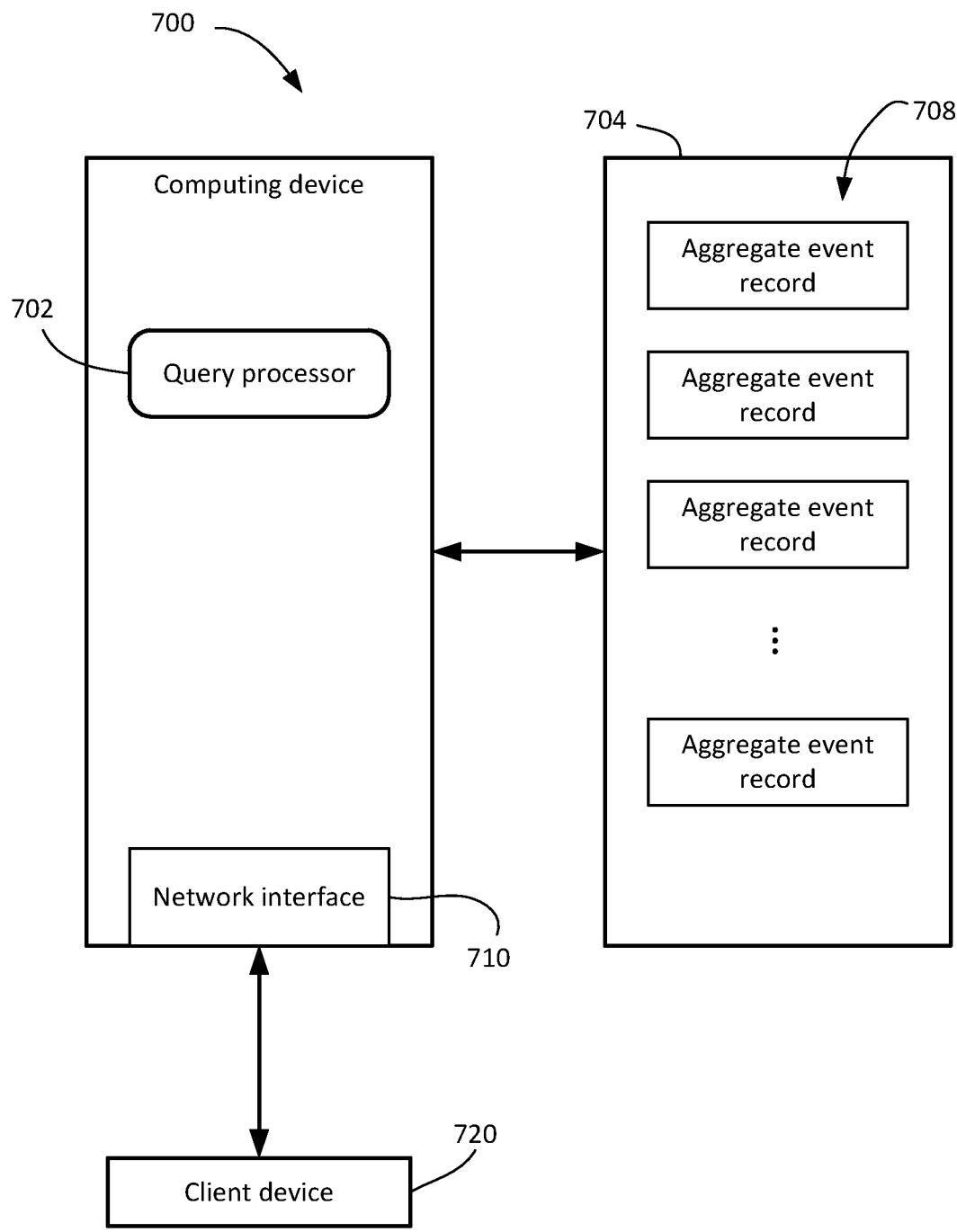
FIG. 7 shows, in block diagram form, a simplified example of a computing device for processing a query regarding aggregated data.

Reference is now made to FIG. 7 which shows, in block diagram form, a simplified example of a computing device 700 for processing a query regarding aggregated data. The computing device may include one or more computing devices. Each computing device may have one or more processors and one or more types of computer-readable media. The computer-readable media may store computer-executable instructions that, when executed by the one or more processors, cause the one or more processors to carry out the below-described operations.

The computing device 700 may include, or may have at least read access to, a data storage device 704 containing a plurality of stored aggregate event records 708. The aggregate event records 708 may be stored in a database or other memory configuration to enable fast searching and retrieval of the aggregate event records 708 based on query parameters. The aggregate event records 708 may be structured to have metadata in defined fields in a header of each record. The metadata may include a merchant ID, a creation timestamp, a window start time, a window end time, and/or other such data.

The computing device 700 may further include a network interface 710 enabling the computing device 700 to communicate with a remote client device 720 through one or more wired or wireless networks, such the Internet.

At least some of the computer executable instructions in the computing device 700 may implement a query processor 702 configured to receive incoming queries. The query processor 702 may be configured to parse an incoming query message and to conduct a search of the aggregate event records 708 to select a set of relevant records for responding to the query. In some implementations, the query processor 702 may be configured to aggregate data from the selected aggregated event records 708 to determine an aggregate total for inclusion in a response message in reply to the query.

The computing device 700 may be the same computing device that implements one or more event aggregators 502 (FIG. 5), or may be a separate computing device.

In one embodiment, the computing device 700 is implemented within an e-commerce platform and queries may be received from the client device 720 through a merchant GUI that provides a merchant data query interface.

Figure 8:
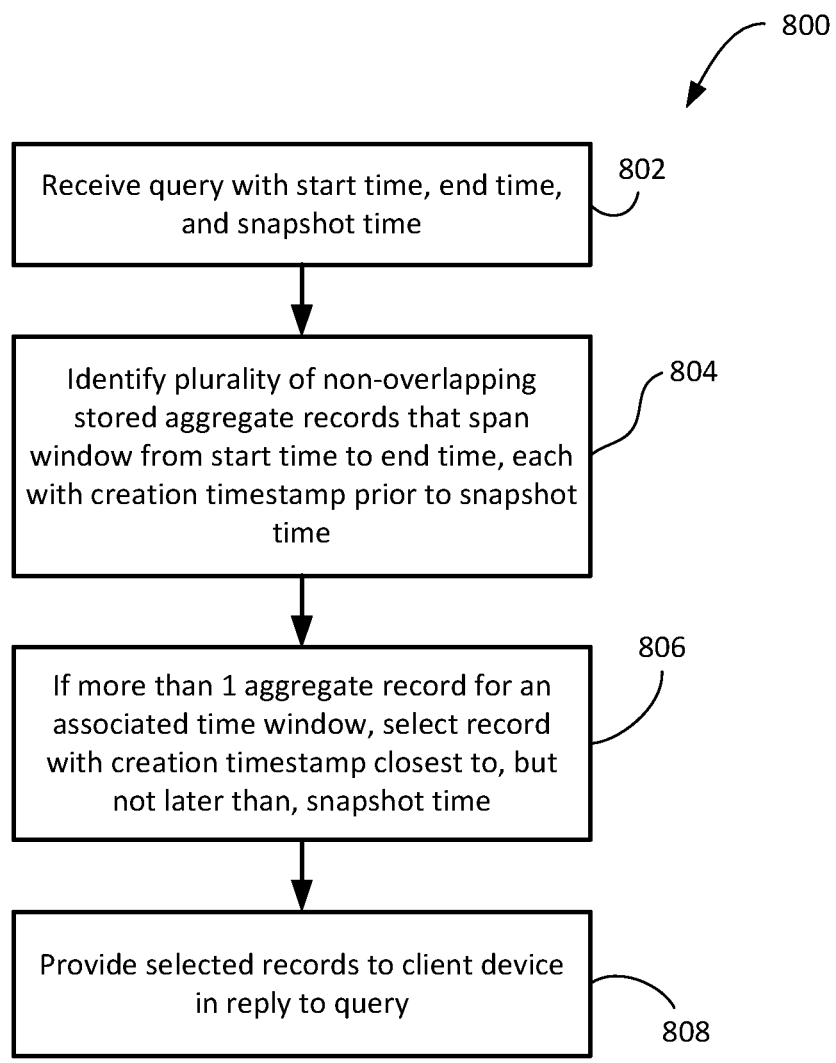
FIG. 8 shows one example method of processing a query for aggregated data.

Reference is now made to FIG. 8, which shows one example method 800 of processing a query for aggregated data. The method 800 may be implemented by a computing device having suitable computer-executable instructions for causing the computing device to carry out the described operations. The method 800 may be implemented, in whole or in part, by a query processor.

In operation 802, the query processor receives a query from a client device requesting a parameter or metric. The query may specify more than one parameter or metric, e.g. sales dollar figures and item sold count. The query may be specific to a product item, a store, a merchant, a class of merchants, etc. The query may specify a start time and an end time or equivalently, a start time and a duration/window length. In some cases, the query may specify a data granularity, e.g. aggregate total, hourly aggregate data, daily aggregate data, weekly aggregate data, etc.

In operation 804, the query processor identifies a plurality of non-overlapping stored aggregate records that span the window length from the start time to the end time. Each stored aggregate record has a creation timestamp equal to or prior to the snapshot time. That is, the query processor may ignore any stored aggregate records with a creation time after the snapshot time. The query processor may, in some cases, select aggregate records having a specified granularity based on the query. For example, if the query requests daily aggregate data, then the query processor may only retrieve stored aggregate records that reflect daily aggregate data. In some cases, if the query requests an aggregate total for the query window, then the query processor may select the stored aggregate records of the largest available granularity to span the query window. For instance, if the query window is Monday Jun. 22, 2020, from 08:00 to 16:30 EST, then the query processor may ignore daily aggregate totals, and may select the largest granularity that fits within the query window. In this example, the largest may be hourly aggregate records spanning 08:00 am to 16:00, and then the next largest granularity to span the window from 16:00 to 16:30, which may be 15 minute aggregate records, for example.

In some instances, there may be more than one aggregate record that has the same associated time window. That is, for example, there may be an original aggregate record relating to a time window with a creation timestamp at or near the end time for that time window and there may be a subsequently-created aggregate record relating to that same time window with a later creation timestamp that reflects an update or change to the aggregate event data. In such a case, provided the later creation timestamp is prior to the snapshot time, then the query processor selects the subsequently-created aggregate record having the later creation timestamp in operation 806.

Having selected the non-overlapping aggregate records that span the query window, the query processor generates and sends a response message to the client device in operation 808. The response message may, in some cases, contain the aggregate data from each of the selected aggregate records. The response message may, in some cases, contain an aggregated total calculated by the query processor from the selected aggregate records.

In some cases, the snapshot time may be a "current time", meaning that the query intends to retrieve current aggregated data. In such cases, data from the selected stored aggregate records may be combined with "bleeding edge", i.e. real-time accumulated data from current event data, and returned in the query. In some cases, the query is a request for live data, and the response message may be a stream of data based on the retrieved selected aggregate data and updated as each new relevant event is detected.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method comprising:
generating a plurality of stored aggregate event records, the generating including:
receiving event data at a first time,
determining that the event data relates to a time prior to the beginning of a current time window,
identifying, based on the time prior to the beginning of the current time window, one of the plurality of stored aggregate event records associated with a previous time window,
creating, for the identified one of the plurality of stored aggregate event records, a new version of that aggregate event record containing updated aggregate event data adjusted by the event data, and storing the new version of that aggregate event record in association with its previous time window and a creation timestamp reflecting the current time;

receiving, from a client device, a query associated with a start time, an end time, and a snapshot time, wherein the snapshot time is a time at or between the end time and a current time and indicates that the query is for a state of aggregated event data as of that time;

identifying the plurality of stored aggregate event records, each having an associated time window, wherein the associated time windows of the plurality of stored aggregate event records are non-overlapping and span a window from the start time to the end time, at least one of the identified stored aggregate event records having multiple versions, where each second and subsequent version of a record contains aggregate data relating to the same associated time window but that was updated in response to event data received after that associated time window that relates an event within that associated time window;

for each identified stored aggregate event record for which there are multiple versions present, selecting a version of that stored aggregate event record having an associated creation timestamp not exceeding the snapshot time; and providing, to the client device, aggregated data from the identified and selected aggregate event records.

2. The method of claim 1, wherein selecting includes selecting the version of that stored aggregate event record based on its creation timestamp being closest to, and not exceeding, the snapshot time.

3. The method of claim 1, wherein the start time includes a start date and time, the end time includes an end date and time, and the snapshot time includes a snapshot date and time.

4. The method of claim 1, wherein identifying includes selecting a minimum number of stored aggregate event records to span the window from the start time to the end time.

5. The method of claim 4, wherein selecting the minimum number includes selecting, from amongst possible stored aggregate event records, at least one stored aggregate event records having the longest associated time window that fits within the window from the start time to the end time.

6. The method of claim 1, wherein the query further includes a specified window length, and wherein identifying the plurality of stored aggregate event records includes selecting stored aggregate event records on the basis that their associated time window has the specified window length.

7. The method of claim 6, wherein providing, to the client device, aggregated data from the identified and selected aggregate event records includes extracting aggregate data from the identified and selected stored aggregate event records and providing the client device with the extracted aggregate data.

8. The method of claim 1, wherein providing, to the client device, aggregated data from the identified and selected aggregate event records includes:
extracting aggregate data from each of the identified stored aggregate event records;
aggregating the extracted aggregate data to produce an aggregated total; and
providing the client device with the aggregated total.

9. The method of claim 1, wherein providing, to the client device, aggregated data from the identified and selected aggregate event records further includes providing the client device with real-time event data.

10. The computer-implemented method of claim 1, wherein identifying includes determining that the time prior to the beginning of the current time window falls with the previous time window.

11. The computer-implemented method of claim 10, wherein identifying further includes identifying two or more stored aggregate event records associated with a same previous time window and selecting one of the two or more stored aggregate event records based on it having a most recent creation timestamp.

12. The computer-implemented method of claim 10, wherein creating includes generating a copy of that stored aggregate event record, adjusting aggregate event data within the copy based on the received event data, and storing the copy containing adjusted aggregate event data as the new version of that aggregate event record.

13. The computer-implemented method of claim 1, further comprising:
receiving additional event data relating to the current time window;
adjusting a current aggregate event parameter based on the additional event data;
determining that the current time matches an end of the current time window; and
responsive to determining that the current time matches an end of the current time window, storing the current aggregate event parameter in a current aggregate event record.

14. The computer-implemented method of claim 1, wherein each stored aggregate event record includes metadata, and the metadata associated with a given stored aggregate record includes an associated previous time window for the given record and a creation timestamp for the given record.

15. The computer-implemented method of claim 14, wherein the metadata further includes at least one of a merchant identifier, a store identifier, or a product identifier.

16. The computer-implemented method of claim 14, wherein the metadata further includes a window start time and a window end time for the associated previous time window.

17. The computer-implemented method of claim 1, wherein the event data relates to a sales metric and wherein each stored aggregate event record includes a respective aggregated total sales metric associated with the previous time window.

18. A non-transitory computer-readable medium storing processor-executable instructions, wherein the instructions, when executed by one or more processors, are to cause the one or more processors to:
generate a plurality of stored aggregate event records, the generating including:
receiving event data at a first time, determining that the event data relates to a time prior to the beginning of a current time window,
identifying, based on the time prior to the beginning of the current time window, one of the plurality of stored aggregate event records associated with a previous time window,
creating, for the identified one of the plurality of stored aggregate event records, a new version of that aggregate event record containing updated aggregate event data adjusted by the event data, and storing the new version of that aggregate event record in association with its previous time window and a creation timestamp reflecting the current time;

receive, from a client device, a query associated with a start time, an end time, and a snapshot time, wherein the snapshot time is a time at or between the end time and a current time and indicates that the query is for a state of aggregated event data as of that time;

identify the plurality of stored aggregate event records, each having an associated time window, wherein the associated time windows of the plurality of stored aggregate event records are non-overlapping and span a window from the start time to the end time, at least one of the identified stored aggregate event records having multiple versions, where each second and subsequent version of a record contains aggregate data relating to the same associated time window but that was updated in response to event data received after that associated time window that relates an event within that associated time window;

for each identified stored aggregate event record for which there are multiple versions present, select a version of that stored aggregate event record having an associated creation timestamp not exceeding the snapshot time; and provide, to the client device, aggregated data from the identified and selected aggregate event records.

19. A computer system, comprising:

one or more processors;

data storage storing aggregate event data records; and a memory storing processor-executable instructions that, when executed by the one or more processors, are to cause the one or more processors to:

generate a plurality of stored aggregate event records, the generating including:

receiving event data at a first time, determining that the event data relates to a time prior to the beginning of a current time window, identifying, based on the time prior to the beginning of the current time window, one of the plurality of stored aggregate event records associated with a previous time window, creating, for the identified one of the plurality of stored aggregate event records, a new version of that aggregate event record containing updated aggregate event data adjusted by the event data, and storing the new version of that aggregate event record in association with its previous time window and a creation timestamp reflecting the current time receive, from a client device, a query associated with a start time, an end time, and a snapshot time, wherein the snapshot time is a time at or between the end time and a current time and indicates that the query is for a state of aggregated event data as of that time;

identify a plurality of stored aggregate event records in the data storage, each having an associated time window, wherein the associated time windows of the plurality of stored aggregate event records are non-overlapping and span a window from the start time to the end time, at least one of the identified stored aggregate event records having multiple versions, where each second and subsequent version of a record contains aggregate data relating to the same associated time window but that was updated in response to event data received after that associated time window that relates an event within that associated time window;

for each identified stored aggregate event record for which there are multiple versions present, select a version of that stored aggregate event record having an associated creation timestamp not exceeding the snapshot time; and provide, to the client device, aggregated data from the identified and selected aggregate event records.

\* \* \* \* \*